Patented Feb. 8, 1944

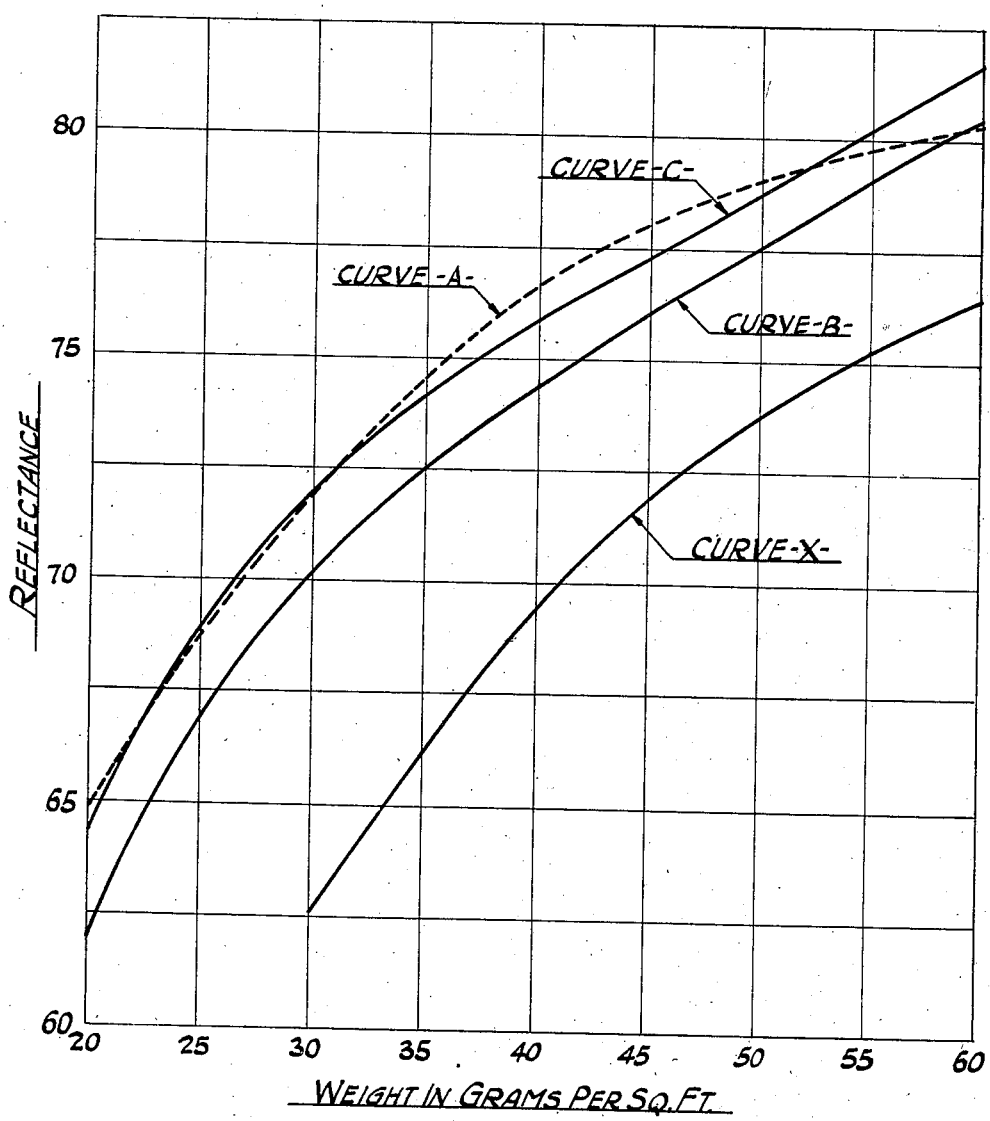

2,340,884

UNITED STATES PATENT OFFICE 2,340,884

ENAMELWARE AND METHOD OF MAKING SAME

Charles J. Kinzie and Charles H. Commons, Jr., Niagara Falls, N. Y., assignors to The Titanium Alloy Manufacturing Company, New York, N. Y., a corporation of Maine Application April 11, 1941, Serial No. 388,032

12 Claims. (Cl. 106—48)

This application is a continuation-in-part of our copending application Serial No. 239,772, filed November 10, 1938, now Patent No. 2,249,007.

Our invention relates to the production of improved coatings of white enamels and glazes on sheet metal, more particularly vitreous enamels on a sheet iron base.

We have discovered a novel process of enameling iron, particularly sheet iron, whereby heretofore unknown and advantageous results in vitreous enamel coatings are attained. One feature of our improved enameling methods resides in the discovery that certain complexes of antimony oxide, titanium oxide or zirconium oxide, and certain group two oxides, with or without certain fluorides, can be used as mill addition opacifiers in percentages considerably higher than is the case of tin oxide and certain zirconium oxide types with unexpected beneficial results in the enamelware produced. Such opacifiers are those described in U. S. Patents Nos. 2,033,707, 2,199,794 and 2,200,170.

In modern enameling the practice is to add not in excess of about 3% of the opacifier at the mill along with clay, water, etc. to a so-called superopaque frit, mill the charge to about 6 to 12 grams residue on a 200 mesh sieve from a 100 cc. slip, and apply the slip in two coats at a total rate of from 55 to 65 grams per square foot. In one coat practice, the mill addition opacifier is increased to from 4 to 6%, milled to the same fineness, and is applied at the rate of about 45 to 50 grams per square foot in one coat. Reflectance results ranging from 68 to about 72 are possible at these rates of application in modern practice.

In our aforesaid Patent No. 2,249,007, we have described and claimed a method of making enamels similar to the present method except that certain types of zirconium oxide are used in place of the opacifier complexes employed in the practice of the present invention. In said copending application a comparison was made between these zirconium oxide opacifiers and older types of zirconium oxide opacifiers and tin oxide, by adding quantities between 1 and 10% at the mill. A similar comparison has also been made utilizing the opacifiers described in patents, Nos. 2,033,707, 2,199,794 and 2,200,170. As these results indicated that these complex opacifiers are capable of continuing to increase opacity when used as an addition at the mill in amounts of over 5% and so produce enamelware with the desired reflectance with low enamel application rates, we decided to make millings of these complex opacifiers in quantities of 10 to 15% and 20%, along with other customary enamel ingredients. Upon applying the enamel slip to ground-coated sheet iron and firing same, we found that the surface was not passable and that the enamel did not smooth out to the lustrous finish obtained with an enamel of the same degree of fineness but having a lower opacifier addition.

After a considerable amount of tests and experimentation, we found that if the frit in the charge carrying the complex opacifier addition was reduced by milling to a particle size considerably finer than normally used, or to a point where over 95% by weight of all the frit particles were at or below 44 microns in size, such an enamel slip could be sprayed onto metalware in exceedingly thin coatings and fired to highly lustrous surfaces having high reflectance with a degree of resistance to mechanical abuse far in excess of any enamel produced by modern methods. We also were surprised to find by calculations that the high mill addition opacified enamel in thin coats was more economical, and that in comparing the raw material costs of our improved methods on the basis of equal reflectance with present practice, our new process gave a lower raw material cost per square foot.

The enamel slips are conveniently sprayed onto a suitable base with a spray gun of the type used in applying organic coatings such as paints and lacquers. Excellent enameling results have also been obtained by the tong dipping method commonly used in the vitreous enameling of iron culinary ware, such as with acid-resisting enamels. Fine opaque white lustrous enamel results have thereby been produced in one thin coat over the dark ground coat, the single cover coating being applied at rates of 20 to 30 grams per square foot, while in comparison the normal practice is to deposit enamel at from 45 to 80 grams per square foot to obtain sufficient coverage in enamelware for culinary usage.

We do not wish to limit the process to the particular proportions of frit, opacifier and other mill additions. We have, for instance, made millings to about 20 microns frit particles with as high as 40 per cent opacifier at the mill, with interesting laboratory enameling results and high degree of opacity at rates as low as 8 grams per square foot and this is a possible development commercially for this process when the technique of application is understood to a degree greater than at present. There appears commercially certain lower limits to the rate of application due to, mainly, the dark ground coating practice used as well as to the equipment available for handling the process. At the moment our efforts commercially are to replace the present normal process of one cover coat application at a rate of 45 to 50 grams per square foot by our new process in one coat at a rate of 25 to 35 grams per square foot, and to replace present normal two cover coat practice of about 60 to 80 grams per square foot either by one coat by our new process at a rate of about 30 to 40 grams per square foot, or in some cases apply our heavily mill opacified finely milled enamel in two coats, the first coat at about 20 to 25 grams per square foot and a finish coat of from 15 to 10 grams per square foot. Our improved processes therefore are not strictly limited to a single cover coat application, but have been practiced with outstandingly good results in two very thin coats. This latter method must be resorted to in some types of work where extra high quality is required as to freedom from enamel defects.

Examples of opacifier complexes which can be used in the practice of this invention are: (1) $2MO.3RO_2.Sb_2O_5$, where R is titanium or zirconium and M is zinc, barium, calcium, beryllium, tin, strontium, magnesium, aluminum, cerium, manganese, lead, copper, or an alkali metal in partial substitution for such metals (described in U. S. Patent No. 2,033,707) and (2) a somewhat similar product containing a fluoride, particularly calcium fluoride. The latter products are more useful, and are described and claimed in U. S. Patents Nos. 2,199,794 and 2,200,170. The most widely used of these from a commercial standpoint is a calcination product of calcium oxide, antimony pentoxide, titanium dioxide and calcium fluoride.

We have made tests with high percentages of these complex opacifiers in our new process. In this series of tests we used a frit of the superopaque type of enamel frits for use on sheet iron. An analysis of this frit shows it to be heavily opacified with antimony compounds and more or less of the same composition as the frit used in Example A of our copending Patent No. 2,249,007, except that no titanium was present and the antimony content was a percent or two lower. This frit, although of the superopaque type, does not yield quite as high opacity as do the frits in said Patent No. 2,249,007, but is high enough to be entirely practical in our process.

With this superopaque frit we made a milling using 100 parts of frit, 7 parts of enameler's clay, 20 parts of a calcination product of calcium oxide, antimony pentoxide, titanium dioxide and calcium fluoride, and 43 parts of water.

This calcination product may be compounded according to any of the six examples set forth in Harshaw, Patent No. 2,199,794. The charge was milled to a fineness of practically all minus 44 microns, and a series of 6" x 4" sheet iron panels prepared in one coat at various application rates. Readings were made for each, and these reflectance readings are presented in graphical form in the drawing (curve A).

In another test, we prepared a series of millings with a commercial superopaque frit heavily opacified with antimony compounds, and is of the type now commonly used to produce opaque results at application rates of 45 to 65 grams per square foot in one and two coats, and with mill additions of from 2 to 4 percent tin oxide or zirconium oxide. The mill mixes were all the same except for the quantity of opacifier, and contained 100 parts of frit, 6 parts of enameler's clay and 43 parts of water.

In the first milling there was additionally added 3 parts of a calcined reaction product of CaO, $Sb_2O_5$, $TiO_2$ and $CaF_2$, (any of the six examples of Harshaw Patent No. 2,199,794) and the mix was milled to a fineness of 10 grams residue from a 100 cc. sample on a 200 mesh sieve, representing the normal enameling practice hitherto used with this type frit. This milling was sprayed onto enamel specimens at various rates of application, the results of opacity measurements being illustrated in curve X of the drawing.

In the second milling, 12 parts of the same calcined product as referred to in the previous paragraph were added, and the mix was milled to a point of fineness where nearly all the frit particles were under 44 microns in size, or as expressed by sieve fineness test a residue of 1 gram from a 100 cc. sample on a 325 mesh screen. This milling was sprayed onto enamel specimens at various rates of application, the results of opacity measurements being illustrated in curve B of the drawing.

The third milling was prepared exactly as the second milling, except that 20 parts of the same calcined reaction product were added instead of 12 parts. The opacity results are illustrated in curve C of the drawing.

The appearance of the panels prepared from these three millings was about as follows: As the quantity of opacifier is increased, the color varies from a cream-white to a cream. The first milling produced a fair to good gloss with good surface. The second milling produced very much better gloss than the first milling with equally good surface. The third milling produced a gloss about the same as the first milling, but the surface was not as well smoothed out as the others. As the increase of opacity from the second to the third milling is not nearly as great as from the first to the second, it is apparent that the preferred quantity of opacifier is below 20%.

Most of the commercial white vitreous enameling on sheet iron involves the use of a dark colored ground coat, usually applied by dipping and draining at a rate of 18 grams per square foot of surface when fired. These dark ground coats have practically no reflectance and reflectance readings may vary from nearly 0 to about 7. The reason we have referred to such dark colored ground coats as being used in our process is because these coats are in commercial use at the present time. We do not, however, limit our invention to the application of our enamel over a conventional dark colored ground coat. For example, our new process of superopaque vitreous enameling could be used in conjunction with the enamel for direct application on metal disclosed in U. S. Patent No. 1,944,938 to Kinzie. By using the slip prepared according to the present invention with the procedure of this U. S. Patent No. 1,944,938 and applying the slip directly to the prepared iron base at a rate of about 25 grams per square foot surface, firing this and applying our new process enamel, we produce white vitreous enamel in the superopaque white class with an extremely low rate of application.

There is also in use, particularly in the vitreous enameling of sheet iron culinary ware, a process in which the iron shape is first coated with a light colored ground coat having some opacity and a reflectance of about 25. Over this ground coat is applied a more opaque enamel in one coat, but the finish coat enamels up to this time have not been opaque enough. For first class ware it has been necessary to apply two cover coats over the light colored ground coat.

In manipulation of the enamel application, it is common practice to add certain electrolytes to increase the set of enamel or in some cases to decrease it. So in our improved process we may, if necessary, resort to such use of small amounts of electrolytes, but usually the characteristics of the slip are such that little or no additions are required. Where required it appears that from ¼ to ½ of one part by weight of sodium nitrite to each 100 parts of frit used is an advantageous addition.

Satisfactory enamel frits for our new and improved process are generally any opaque white frit which when milled 100 parts by weight of frit, 6 parts by weight vallendar clay, 0.25 part by weight of magnesium carbonate, 40 parts by weight of water to a fineness of 12 grams residue on 200 mesh sieve from a 100 cc. sample applied to ground coated sheet iron in two coats at a total of 72 grams per square foot will have a reflectance of about 60; preferably a reflectance reading of 70 or above is desired (see Reflectance Test for Opaque White Vitreous Enamels, published March 1937 by Tech. Research Section Educational Bureau Porcelain Enamel Institute, 612 North Michigan Avenue, Chicago, Illinois).

Reasonably satisfactory mill addition opacifiers are those which can be used in the high percentages to produce lustrous opaque white enamel finishes at rates of about 10 grams per square foot up to about 40 grams per square foot. Such mill addition opacifiers can be described as extremely fine powders having a refractive index above 1.8, preferably above 2.00, which are stable or essentially so in contact with the fused enamel frit particles during the firing of the enamel onto the ware, and also capable of being used in such amounts at the mill so as to produce opaque vitreous enamel coatings having a reflectance of more than 70 when applied at a rate of 40 or less grams per square foot.

When parts are mentioned, parts by weight are understood. Reflectance figures, when given, are figures as measured by the Hunter reflectometer.

As many variations are possible within the scope of this invention, it is not intended to be limited except as defined by the appended claims.

We claim:

1. The method of making white vitreous enamel ware with coatings less in weight than 40 grams per square foot and having a reflectance above 70 and substantially greater than that producible with the frit used and clay alone, which comprises milling a mixture of a white frit 100 parts by weight having a basic reflectance above 60, clay, water and not less than 10 parts by weight of an opacifier comprising a calcination product containing an oxide of a base forming metal, antimony pentoxide, and an oxide from the group consisting of titanium and zirconium, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

2. The method of making white vitreous enamel ware with coatings less in weight than 40 grams per square foot and having a reflectance above 70 and substantially greater than that producible with the frit used and clay alone, which comprises milling a mixture of a white frit 100 parts by weight having a basic reflectance above 60, clay, water and from about 10 to 20 parts by weight of an opacifier comprising a calcination product containing an oxide of a base forming metal, antimony pentoxide, and an oxide from the group consisting of titanium and zirconium, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

3. The method of making white vitreous enamel ware with coatings less in weight than 40 grams per square foot and having a reflectance above 70 and substantially greater than that producible with the frit used and clay alone, which comprises milling a mixture of a white frit 100 parts by weight having a basic reflectance above 60, clay, water and not less than 10 parts by weight of an opacifier comprising a calcination product containing an oxide of a base forming metal, antimony pentoxide, an oxide from the group consisting of titanium and zirconium, and a fluoride, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

4. The method of making white vitreous enamel ware with coatings less in weight than 40 grams per square foot and having a reflectance above 70 and substantially greater than that producible with the frit used and clay alone, which comprises milling a mixture of a white frit 100 parts by weight having a basic reflectance above 60, clay, water and from about 10 to 20 parts by weight of an opacifier comprising a calcination product containing an oxide of a base forming metal, antimony pentoxide, an oxide from the group consisting of titanium and zirconium, and a fluoride, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

5. The method of making white vitreous enamel ware with coatings less in weight than 40 grams per square foot and having a reflectance above 70 and substantially greater than that producible with the frit used and clay alone, which comprises milling a mixture of a white frit 100 parts by weight having a basic reflectance above 60, clay, water and not less than 10 parts by weight of an opacifier comprising a calcination product containing calcium oxide, antimony oxide, titanium oxide, and calcium fluoride, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

6. The method of making white vitreous enamel ware with coatings less in weight than 40 grams per square foot and having a reflectance above 70 and substantially greater than that producible with the frit used and clay alone, which comprises milling a mixture of a white frit 100 parts by weight having a basic reflectance above 60, clay, water and from about 10 to 20 parts by weight of an opacifier comprising a calcination product containing calcium oxide, antimony oxide, titanium oxide, and calcium fluoride, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

7. The method of making white vitreous enamel ware with coatings less in weight than 40 grams per square foot and having a reflectance above 70 and substantially greater than that producible with the frit used and clay alone, which comprises milling a mixture containing 100 parts by weight of a white frit, clay, water and not less than 10 parts by weight of an opacifier comprising a calcination product containing an oxide of a base forming metal, antimony pentoxide, and an oxide from the group consisting of titanium and zirconium, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

8. The method of making white vitreous enamel ware with coatings less in weight than 40 grams per square foot and having a reflectance above 70 and substantially greater than that producible with the frit used and clay alone, which comprises milling a mixture containing 100 parts by weight of a white frit, clay, water and from about 10 to 20 parts by weight of an opacifier comprising a calcination product containing an oxide of a base forming metal, antimony pentoxide, and an oxide from the group consisting of titanium and zirconium, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

9. The method of making white vitreous enamel ware with coatings less in weight than 40 grams per square foot and having a reflectance above 70 and substantially greater than that producible with the frit used and clay alone, which comprises milling a mixture containing 100 parts by weight of a white frit, clay, water and not less than 10 parts by weight of an opacifier comprising a calcination product containing an oxide of a base forming metal, antimony pentoxide, an oxide from the group consisting of titanium and zirconium, and a fluoride, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

10. The method of making white vitreous enamel ware with coatings less in weight than 40 grams per square foot and having a reflectance above 70 and substantially greater than that producible with the frit used and clay alone, which comprises milling a mixture containing 100 parts by weight of a white frit, clay, water and from about 10 to 20 parts by weight of an opacifier comprising a calcination product containing an oxide of a base forming metal, antimony pentoxide, an oxide from the group consisting of titanium and zirconium, and a fluoride, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

11. The method of making white vitreous enamel ware with coatings less in weight than 40 grams per square foot and having a reflectance above 70 and substantially greater than that producible with the frit used and clay alone, which comprises milling a mixture containing 100 parts by weight of a white frit, clay, water and not less than 10 parts by weight of an opacifier comprising a calcination product containing calcium oxide, antimony oxide, titanium oxide, and calcium fluoride, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

12. The method of making white vitreous enamel ware with coatings less in weight than 40 grams per square foot and having a reflectance above 70 and substantially greater than that producible with the frit used and clay alone, which comprises milling a mixture containing 100 parts by weight of a white frit, clay, water and from about 10 to 20 parts by weight of an opacifier comprising a calcination product containing calcium oxide, antimony oxide, titanium oxide, and calcium fluoride, said mixture being ground to a fineness where more than 95% by weight of the particles thereof are less than 44 microns in size to form the enamel slip, applying the said slip to ground coated ware in a thin film not exceeding 40 grams per square foot when fired, and burning the slip-coated ware at firing temperatures to produce said adherent vitreous enamel ware.

CHARLES J. KINZIE.
CHARLES H. COMMONS, Jr.